J. W. BARTON.
STEAM TRAP.
APPLICATION FILED MAR. 13, 1909.
941,847.
Patented Nov. 30, 1909.
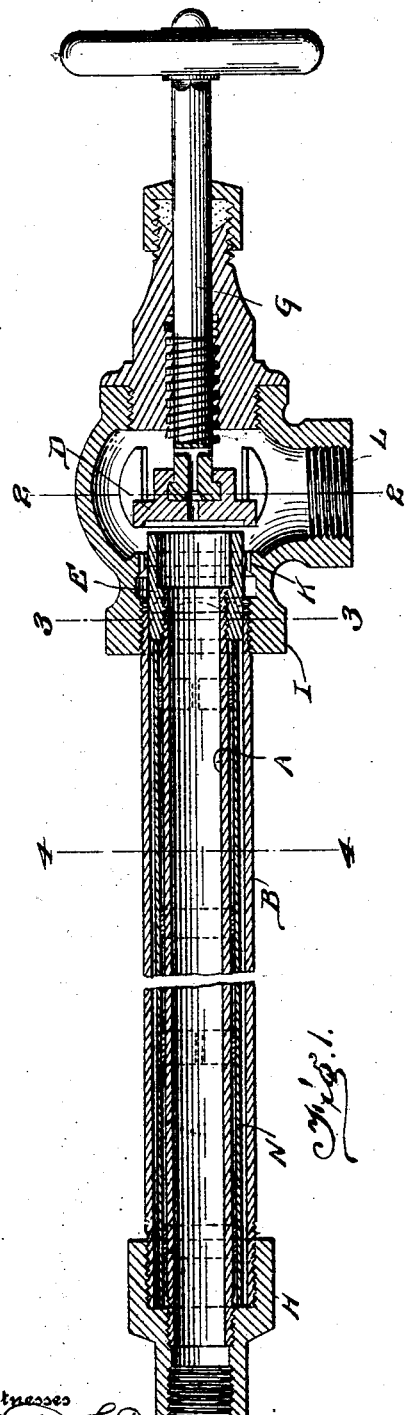
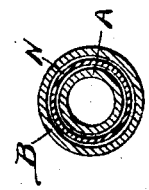
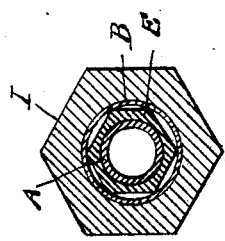
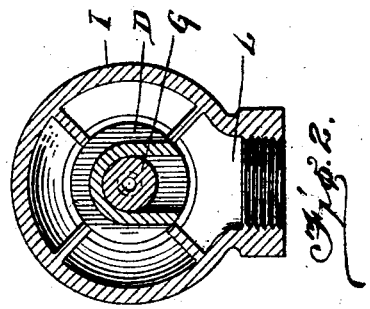
Inventor
John W. Barton.

UNITED STATES PATENT OFFICE.

JOHN W. BARTON, OF CLEVELAND, OHIO.

STEAM-TRAP.

941,847.  Specification of Letters Patent.  Patented Nov. 30, 1909.

Original application filed November 21, 1908, Serial No. 463,815. Divided and this application filed March 13, 1909. Serial No. 483,175.

*To all whom it may concern:*

Be it known that I, JOHN W. BARTON, a citizen of the United States, residing at Cleveland, in the county of Cuyahoga and State of Ohio, have invented certain new and useful Improvements in Steam-Traps, of which the following is a specification.

This application is a division of my pending application, No. 463,815, filed Nov. 21, 1908, and the invention relates to steam traps of the type having an expansion tube.

The present case and the invention covered thereby relates especially to means to produce a result which is not, so far as I know, possible with any other steam trap; that is, a trap constructed according to this invention will operate automatically with either a vacuum or a gravity system of steam heating, and this result follows from the relative coefficients of expansion of the tubes used in constructing the trap, and the relative size of the valve opening, as more fully defined and explained hereinafter.

Merely for the purpose of illustration a form of trap is shown in the accompanying drawings to which the invention is applicable, but it may also be applied to expansion tube traps of various other types, and no limitation with respect to the scope of the invention is implied by reason of the particular form of trap shown and described herein.

In the accompanying drawings, Figure 1 is a longitudinal section of the trap used for the purpose of illustration. Figs. 2, 3 and 4 are sections on the lines 2—2, 3—3 and 4—4 of Fig. 1 respectively.

The particular mechanical construction of this trap will be found fully described in the pending application above referred to, and for the purposes of the present case, the following parts are specified:

A is an expansion tube screwed at one end into the fitting H. This tube is located within and spaced from the outer tube B which is also screwed into the bell of the fitting H. The opposite end of the tube B is screwed into the casing I of the main valve. The end of the expansion tube is provided with a tubular valve seat E which may be screwed on to desired adjustment. Between the tubes A and B is an annular space or vacuum chamber which is closed at one end, but which opens at the other end into the valve casing through spaces around the valve seat E and through holes K in a guide formed in the valve casing. The valve disk D is connected to a screw stem G by which the valve E is opened or closed or adjusted. The inlet to the trap is through the fitting H, and the outlet is at L, which latter will or may be connected to a vacuum pump or to a waste outlet.

In the annular space between the tubes A and B is a tubular casing N which is not material to the present invention and which is fully described and claimed in the said application and which needs no further reference here except to say that it preserves a dead air space around the tube A. It may be omitted without affecting the invention claimed herein.

In operation the valve disk is properly adjusted to allow condensation to escape as it forms. When a vacuum pump is used a vacuum is drawn in the annular space between the tubes B and N, or between the tubes B and A if the tube N is omitted, thereby making said space non-conducting, which keeps the outer tube B cooler than the expansion tube A. If the vacuum pump should fail to work, the steam enters the space between the tubes and expands the outer tube B, thereby opening the valve far enough to allow the escape of the water of condensation. As long as the pump is working the expansion tube A operates in the usual manner to open or close the valve according to the degree of heat. Ports K prevent the expansion of the valve seat from closing or cutting off the opening to the vacuum chamber, and consequently the trap will work under all conditions.

When the vacuum pump is working the inner tube A expands as usual, but the outer tube B does not relatively expand because of the vacuum therein, and consequently the steam does not reach said tube B, and also, the flow of condensation is not through the same, and the increase of vacuum tends to cool the outer tube. When the vacuum pump stops the hot vapor or water will pass through the holes K into the outer tube and expand the same, thereby opening the valve and increasing the lift thereof, which latter point is of decided importance. Hence the trap is adapted for use with either a vacuum system or a gravity system, and in either case the expansion tube A operates in the usual manner to open or close the valve according to the degree of heat, which is a result hitherto unknown. This result follows from the relative coefficients of expansion of the inner tube A and the outer tube B, and the relative size of the valve opening. The coefficient of expansion of the inner tube is considerably greater than that of the outer tube, for if the outer tube should expand as much as the inner tube, the trap would not operate with a gravity system, because the outer tube would expand practically as much as the inner tube, and thereby force the valve away from the seat, or, in other words, the seat would never overtake the valve, without readjustment of the valve. In my device the ratio of expansion of the inner tube A is so much greater than that of the outer tube B that the valve seat closes against the valve at the temperature of steam, and the area of the valve is so large that the necessary escape of any condensation will occur without drawing the valve seat a great distance from the valve. The area of the valve should be in proportion to the length of the expansion tube, that is, the longer the tube the larger the area of the valve must be, in order to adapt the trap for automatic use with both a vacuum system and a gravity system, a large valve area being required on a long tube to allow a sufficiently rapid escape or flow to clear the whole tube of condensation in order to effect the desirable instantaneous or immediate action of the trap.

The trap may be constructed according to a general formula for calculating the proper length of tubes, so that the expansion of the outer tube will be sufficient to compensate for the fall in pressure difference available for causing discharge, if the vacuum should be destroyed. It is assumed that there is 1 lb. per sq. inch above atmospheric pressure, in the inner tube at all times. It is also assumed that there is a vacuum of 14″ (or 7 lbs.) normally when the pump is operating; but that if the pump stops this back pressure rises to atmospheric pressure.

The length of the tubes must be calculated in terms of a certain rate of discharge through the trap. At any rate greater than this the water will collect in the inner tube; at any less rate there will be no collection of water in the inner tube. Let this rate of discharge $= W$ lbs. per hr.

(I.)

Symbols used:
$W =$ rate of discharge, in lbs. per hr.
$q =$ rate of discharge, in cu. ft. per sec.
$F =$ area of valve opening in sq. inches.
$h =$ available "head" for causing discharge.
$c =$ coefficient of valve orifice (assumed $= .6$).

$q = cF\sqrt{2 \times 32.2 \times h}$ (from *Hydraulics*.)

$$\frac{W}{62.5 \times 3600} = 6F.\sqrt{64.4 \times h} \times 144.$$

[$h = 2.3 \times$ press. in lbs. per sq. inch. $h = 2.3 \times 8 = 18.4$ ft. when pump operates. $h = 2.3 \times 1 = 2.3$ ft. when pump does not operate.]

From above formula—
$F = .000031$ W sq. in. when pump operates.
$F = .000088$ W sq. in. when pump does not operate.

(II.)

$l =$ opening of valve from its seat (in inches.) $d =$ diam. of valve. Hence—

$$l = \frac{F}{\pi d}$$

$l = .000010 \frac{W}{d}$ when pump operates.

$= 00028 \frac{W}{d}$ when pump does not operate.

(III.)

The difference between these two openings must be equal to the expansion of the outer tube.

Let $a =$ the expansion of outer tube (inches).
Let $L =$ the length of tube.
Let $T =$ the rise of temp. of outer tube.
Let $C =$ temperature coefficient of expansion.
Hence—
$a = CTL$.
$C = .00000599$ per degree Fahr. for untempered steel.
$T = 212° - 180° =$ rise of temp. from 14″ of vacuum to atmospheric.

(IV.)

$a = .00000599 \times 32 \times L$ $a = .000028 \frac{W}{d} - .000010 \frac{W}{d} = .000018 \frac{W}{d}$ $.00000599 \times 32 \times L = .000018 \frac{W}{d}$ $L = \frac{.000018}{.000192} \cdot \frac{W}{d} = \frac{W}{10.7d}$ inches.

This is the final expression for L, the length of tube to discharge W lbs. per hr. with no water collecting in inner tube. Thus in a sample trap, $$d = \frac{3''}{4}$$

If W be assumed as 125 lbs. per hr.

$$L = \frac{W}{10.7d} = \frac{125}{10.7 \times .75} = 15.6''$$

Hence the tube should be made 15.6" long in order to discharge 125 lbs. of water per hr. with none collecting in the inner tube, and hence no contraction of the inner tube.

A general expression of the equation, instead of the concrete and special values above given, may be derived from the following equations:

$$l = \frac{F}{\pi d}, \quad F = \frac{q}{c'\sqrt{2gh}};$$

$$a = l - l \text{ vacuum} = \frac{F - F \text{ vacuum}}{c'\pi d} =$$

$$\frac{l}{c'\pi d}\left(\frac{q}{\sqrt{2gh}} - \frac{q}{\sqrt{2gh.\text{vac.}}}\right) = CTL.$$

The final form then is $$a = CTL = \frac{l}{c'\pi d}\left(\frac{q}{\sqrt{2gh}} - \frac{q}{\sqrt{2gh.\text{vac.}}}\right),$$

the coefficient $c'$ being inserted to take care of the discharge from the orifice not being quite equal to the theoretical discharge. The equation could be reduced slightly further and solved for L thus:

$$L = \frac{q}{CTc'\pi d\sqrt{2g}}\left(\frac{l}{\sqrt{h}} - \frac{l}{\sqrt{h.\text{vac.}}}\right).$$

It has been found that a trap constructed according to this invention will work perfectly, without adjustment, on a heating system using vacuum at times and gravity at other times, as on day and night work where the pump is operated during the day and idle during the night, which is not true of any other trap known to me, and a device of great utility is provided for use under variable conditions, without necessity for the constant attention and manipulation required with existing traps.

I claim:

1. A steam trap having inner and outer expansible tubes, and a valve carried by the outer tube and coöperating with the inner tube to open or close the same, the coefficient of expansion of the inner tube being greater than that of the outer tube, and the length and coefficient of expansion of the outer tube being in a proportion to the area of the valve opening proper to allow escape of condensation in the presence of a partial vacuum or otherwise.

2. A steam trap having inner and outer expansible tubes, a valve casing and valve carried by the outer tube, and a valve seat carried by the inner tube, the coefficient of expansion of the inner tube being greater than that of the outer tube, and the length and coefficient of expansion of the outer tube being in a proportion to the outlet area of the valve seat proper to allow escape of condensation in the presence of a partial vacuum or otherwise.

3. A steam trap having inner and outer expansible tubes, and a valve coöperating with the inner tube and opened or closed by variations in the length thereof, the length and coefficient of expansion of the outer tube being proper to compensate for the decrease in effective discharge pressure due to the failure of vacuum in the trap discharge by causing a corresponding increase in the discharge area between the valve and the inner tube when the valve is open.

4. A steam trap having inner and outer expansible tubes, and a valve carried by the outer tube and coöperating with the inner tube to open or close the latter, the length of the outer tube corresponding to the formula $$L = \frac{q}{CTc'\pi d\sqrt{2g}}\left(\frac{l}{\sqrt{h}} - \frac{l}{\sqrt{h.\text{vac.}}}\right)$$

as specified.

5. A steam trap for vacuum heating systems having an outer expansion tube and an inner expansion tube whose coefficient of expansion is greater than that of the outer tube, the space between said tubes being always in communication with the discharge outlet from the trap, and a valve means connected to said outer tube which acts to control the area of discharge through said inner tube according to its expansion and contraction relative thereto, the length and coefficient of expansion of said outer tube bearing such a relation to the dimensions of the valve mechanism that the amount discharged from the trap will not be affected by cessation of the vacuum in the discharge outlet.

In testimony whereof, I affix my signature in presence of two witnesses.

JOHN W. BARTON.

Witnesses:
 JOHN A. BOMMHARDT,
 MONROE E. MILLER.

Corrections in Letters Patent No. 941,847.

It is hereby certified that in Letters Patent No. 941,847, granted November 30, 1909, upon the application of John W. Barton, of Cleveland, Ohio, for an improvement in "Steam-Traps," errors appear in the printed specification requiring correction as follows: Page 3, line 36, and line 91, in the equations, the letters "$l$" should read $1$, (unity); and that the said Letters Patent should be read with these corrections therein that the same may conform to the record of the case in the Patent Office.

Signed and sealed this 5th day of April, A. D., 1910.

[SEAL.]
C. C. BILLINGS,
*Acting Commissioner of Patents.*